(12) United States Patent
Godwin

(10) Patent No.: US 7,243,431 B2
(45) Date of Patent: Jul. 17, 2007

(54) TRAILER HITCH ALIGNMENT DEVICE

(76) Inventor: W. Lee Godwin, 21472 NE. W.L. Godwin Rd., Blountstown, FL (US) 32424

( * ) Notice: Subject to any disclaimer, the term of this patent is extended or adjusted under 35 U.S.C. 154(b) by 0 days.

(21) Appl. No.: 11/103,313

(22) Filed: Apr. 11, 2005

(65) Prior Publication Data

US 2006/0225293 A1    Oct. 12, 2006

(51) Int. Cl.
*B60D 1/36* (2006.01)
(52) U.S. Cl. .............. 33/264; 33/286; 33/370; 280/477
(58) Field of Classification Search ......... 33/264, 33/286, 288, 227, 228, 351, 353, 354, 370, 33/371, 374, 375, DIG. 21, 372, 373, 451; 116/28 R; 280/477
See application file for complete search history.

(56) References Cited

U.S. PATENT DOCUMENTS

| | | | | |
|---|---|---|---|---|
| 898,092 | A * | 9/1908 | Carrier | 33/352 |
| 4,583,481 | A * | 4/1986 | Garrison | 116/28 R |
| 4,621,432 | A * | 11/1986 | Law | 33/264 |
| 5,657,175 | A * | 8/1997 | Brewington | 359/872 |
| 5,931,519 | A * | 8/1999 | Jeffers et al. | 296/57.1 |
| 5,966,826 | A * | 10/1999 | Ho | 33/365 |
| 6,167,630 | B1 * | 1/2001 | Webb | 33/354 |
| 6,176,505 | B1 | 1/2001 | Capik et al. | |
| 6,178,650 | B1 * | 1/2001 | Thibodeaux | 33/286 |
| 6,209,902 | B1 * | 4/2001 | Potts | 280/477 |
| 6,252,497 | B1 | 6/2001 | Dupay et al. | |
| 6,386,572 | B1 * | 5/2002 | Cofer | 280/477 |
| 6,470,579 | B2 * | 10/2002 | Allen | 33/286 |
| 6,592,230 | B2 | 7/2003 | Dupay | |
| 6,640,456 | B2 * | 11/2003 | Owoc et al. | 33/382 |
| 6,739,062 | B2 * | 5/2004 | Jan et al. | 33/286 |
| 6,769,709 | B1 * | 8/2004 | Piper et al. | 280/477 |
| 6,793,494 | B2 | 9/2004 | Varshneya et al. | |
| 6,823,598 | B1 * | 11/2004 | Loescher | 33/286 |
| 6,827,363 | B1 * | 12/2004 | Amerson | 280/477 |
| 6,834,878 | B2 * | 12/2004 | Koestler | 280/477 |
| 6,880,256 | B2 * | 4/2005 | Helms | 33/286 |
| 6,900,724 | B2 * | 5/2005 | Johnson | 340/431 |
| 6,932,374 | B1 * | 8/2005 | Timms et al. | 280/477 |
| 7,059,059 | B1 * | 6/2006 | Ames | 33/372 |
| 2002/0100175 | A1 * | 8/2002 | King | 33/264 |
| 2003/0057675 | A1 * | 3/2003 | Grantland | 280/477 |
| 2004/0083615 | A1 * | 5/2004 | Cotner | 33/288 |
| 2004/0252019 | A1 * | 12/2004 | Paull | 340/431 |

\* cited by examiner

*Primary Examiner*—G. Bradley Bennett
*Assistant Examiner*—Amy R. Cohen
(74) *Attorney, Agent, or Firm*—Clements Walker; Richard A. Walker

(57) ABSTRACT

The invention is a trailer hitch alignment device that synergistically combines a laser level with an alignment mounting bracket, where the bracket, using a fastening means, provides a base on a vehicle for affixing the laser level to a vehicle. The laser level provides a laser beam which projects a lighted image that is a guide for coupling the trailer to a fifth wheel hitch on the vehicle. The level provides a means for confirming that the trailer, the vehicle, and the coupled trailer and vehicle all have the proper weight distribution as evidenced by their angle.

5 Claims, 3 Drawing Sheets

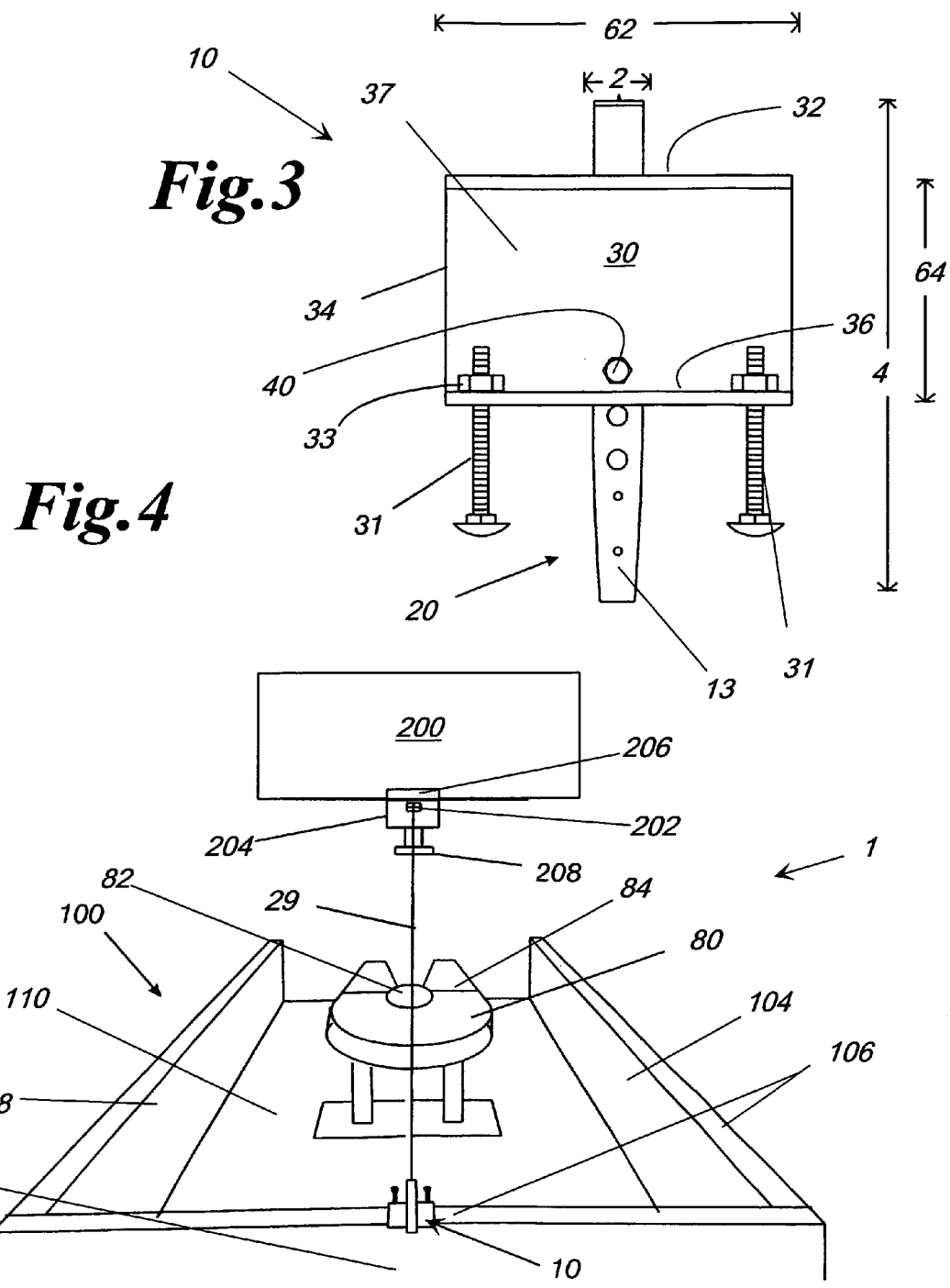

TRAILER HITCH ALIGNMENT DEVICE

BACKGROUND OF THE INVENTION

1) Field of the Invention

The invention relates to a trailer hitch device, and more particularly to a trailer hitch alignments device for hitching a trailer to a vehicle fitted with a fifth wheel hitch, where the device is additionally a laser level.

2) Prior Art

U.S. Pat. No. 6,176,505 B1 to Capik et al. teaches an optically guided alignment system. The invention teaches a trailer hitch alignment apparatus having a pair of light sources that emit different color light beams. The patent teaches that a single light source 24 can be aligned with a target 32, and discusses this in col. 5, lines 3-10. Referring to FIG. 3, alternate positions are shown for light source 22 (not shown) and 24. The light source is located adjacent to the rear 48 of cab section 50 of a pickup truck. Colored light beams 18, 20 are directed at a target location 32 at a point, which offers the driver of the tow vehicle 10 an unobstructed view of the target location 32.

U.S. Pat. No. 6,252,497 B1 to Dupay et al. teaches a coupling alignment warning system (CAWS). The invention utilizes electronic circuit to analyze a laser beam directed from the back of the cab to a target onto the trailer 62. In its broadest sense the invention teaches, as shown in FIG. 3 and 4, and discussed in col. 7, line 65 to col. 8, line 10, a rugged enclosure 64 is mounted to a back wall 66 of towing unit 60, above the grease and contaminant area, so that light beam 15 emitted by a laser source 12, is directed generally perpendicular to wall 66 of towing unit 60. Further, rugged enclosure 64 is mounted at a height X defined by a top surface 84 of plate hitch 80 when hitch plate 80 is level and the axis beam emitted from the laser source 12 being mounted in rugged enclosure 64 as best shown in FIG. 3. Retro-reflective target 70 is mounted to a front vertical surface 68 of towed unit 62 at a height corresponding to the height X at which the rugged enclosure is installed. The rugged enclosure is the term employed in the patent to describe a laser mounted in a protective housing.

U.S. Pat. No. 6,592,230 B2 to Steven C. Dupay is a continuation-in-part of U.S. Pat. No. 6,252,497 B1 cited above. Illustrated in FIG. 6 and described in col. 10, lines 8-13 is a laser source 12 mounted in a rugged enclosure 64 aligned so that the laser light beam 15 strikes the center of a retro-reflective target 70.

U.S. Pat. No. 6,793,494 B2 to Varshneya et al. teaches a laser small arms transmitter that can be clamped to a barrel of a weapon such as an M17 rifle. The clamp is shown in FIGS. 1 and 4 and described in col. 5, line 61. Shafts 30 and 32 (FIG. 4) extend downwardly from the projections 24d and 24e. A clamp 34 (FIG. 3) has a pair of apertures 36 and 38 through which the shafts 30 and 32 extend, respectively. A bolt end 40 on the lower end of the shaft prevents the clamp from being completely removed.

While the prior art teaches the use of lasers to determine optical ranging, it fails to teach a relatively inexpensive device that can be quickly fitted to a vehicle, usually a pickup truck, having a fifth wheel hitch that is typically removable. Furthermore, the prior art does not teach a device that can have multiple functions, both on and off the pickup truck, where the functions are all incorporated into one device. Furthermore, the prior art does not teach a device that can be quickly removed from the vehicle, as it, like the fifth wheel, will not advantageously be permanently fixed to the vehicle. What is further needed is a device that is user friendly, and substantially requires little or no training.

SUMMARY OF THE INVENTION

In the broadest sense, the invention is a trailer hitch alignment device that synergistically combines a laser level with an alignment mounting bracket, where the bracket, using a fastening means, provides a base on a vehicle for affixing the laser level to the vehicle. The laser level provides a laser beam, which is a visible guide for coupling the trailer to a fifth wheel hitch on the vehicle. The image created by the beam is preferably selectable, and is either a spot or a projected line. The spot has the advantage that it is more intense and easy to see in either day or night. The projected line has the advantage that as the distance from the laser increases, the length of the line increases. Therefore, a user can determine the distance to the trailer by the length of the line. The laser level also provides a means for confirming that the trailer, the vehicle, and the vehicle with the hitched trailer all have the proper weight distribution, as evidenced by their angle with respect to the road. The level has one or more bubble tubes for determining whether a surface is plumb and perpendicular to plumb (e.g., level). The alignment mounting bracket is preferably selected so that it can be quickly and reversibly fitted to the vehicle. In the case of a pickup truck, the bracket is sized so that it can fasten to the front wall of the truck bed. In the case of a tractor the bracket is suitably constructed to fasten to the rear of a cab. The fastening means is suitably selected to enable the laser level to be easily fastened to the alignment bracket, and to have the correct height and orientation. In the case of a pickup truck, the fifth wheel is mounted in the truck bed and the fifth wheel has a height such that the hitch clears the truck bed walls. When the alignment mounting bracket is mounted on the top ledge of the truck bed of the front wall, the laser beam has the desired height. Therefore, the fastening means desirably mounts the laser level substantially flush with the alignment mounting bracket. It is anticipated that the alignment mounting bracket could also be attached to the cab, the frame, or other positions on the front wall.

Furthermore the invention is a trailer hitch alignment system, where the system is comprised of a) a trailer hitch alignment device; b) a truck having a fifth wheel hitch with a top plate and a front wall of a truck bed, where the fifth wheel hitch is mounted on the truck bed of the truck; and c) a trailer having a tongue, where the tongue of the trailer has a pull pin and a visible reference surface with a target alignment zone. In the system the device is mounted on a top ledge of the front wall of the truck bed at a point substantially equidistant from a left and a right side of the truck, with the laser aimed toward the rear of the truck so that the laser beam bisects the top plate of the fifth wheel hitch and projects a lighted image on the visible reference surface of the trailer, when the truck is properly aligned with the trailer. The truck position can be steered so as to maintain the lighted image within an acceptable target alignment zone as the truck is backed up. Alignment is completed when the pull pin engages the socket of the fifth wheel hitch.

After coupling the weight distribution can be checked by using the laser level to check that the vehicle is substantially level. Before coupling, the laser level can confirm that the trailer is properly oriented for hitching, and the vehicle, which is usually a, pickup truck, is properly set up for pulling the trailer.

When the trailer hitch alignment device is not being used to align trailers, the laser level can be disconnected from the alignment mounting bracket, and used as a conventional level. Typical applications for a laser level include determining the orientation of floors, poles, walls, pictures, shooting lines for roofs or fences, using the level to draw straight lines, and in general confirming that a surface is plumb or perpendicular. The functionality of any given laser level will dependent on the selection of level, and the scope of the invention is not limited by the selection of the laser level.

BRIEF DESCRIPTION OF THE DRAWINGS

The foregoing and other objects will become readily apparent by referring to the following detailed description and the appended drawings in which:

FIG. 3 is a bottom plan view of the trailer hitch alignment device.

FIG. 4 is a diagrammatic perspective view of the trailer hitch alignment system.

DETAILED DESCRIPTION

Figure 1:
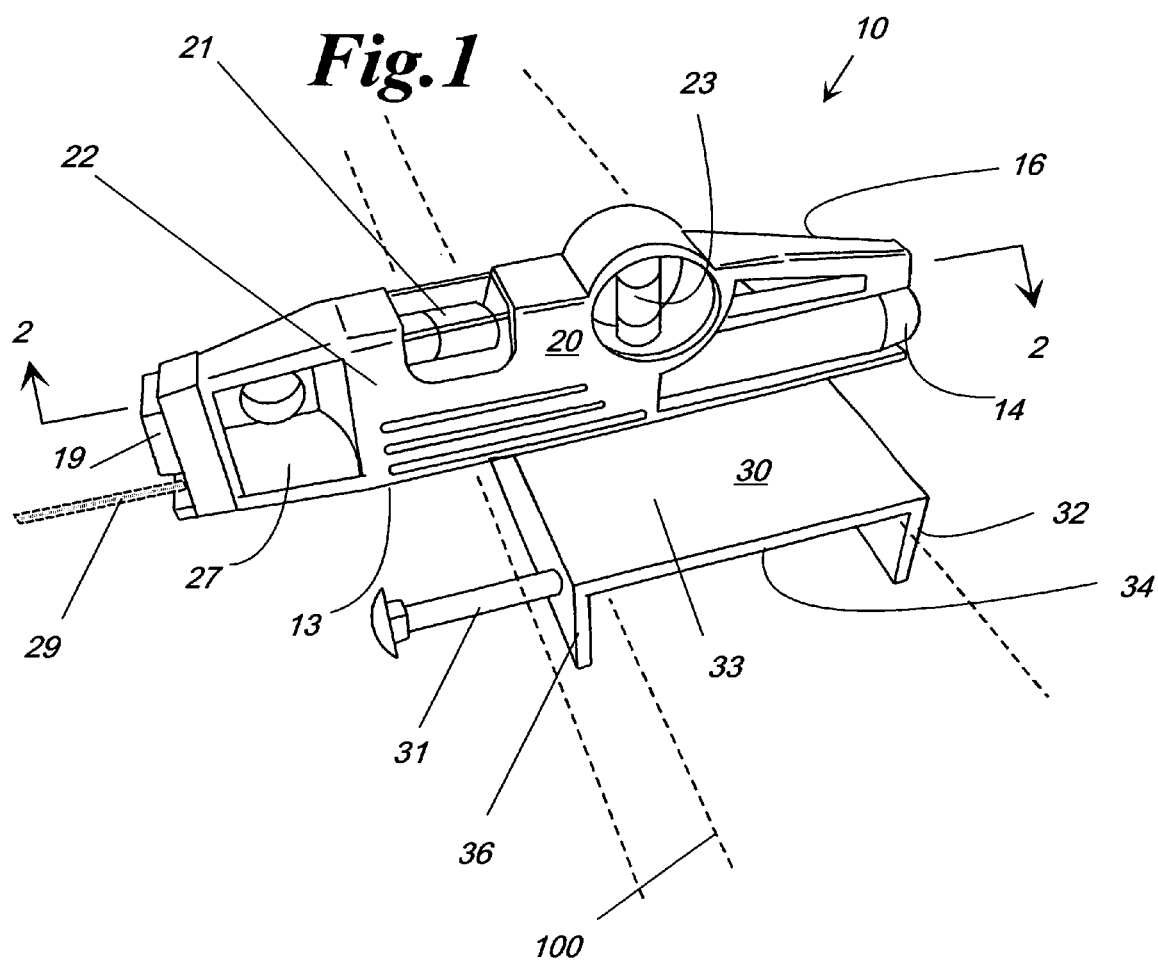
FIG. 1 is a perspective view of the trailer hitch alignment device.
Figure 2:
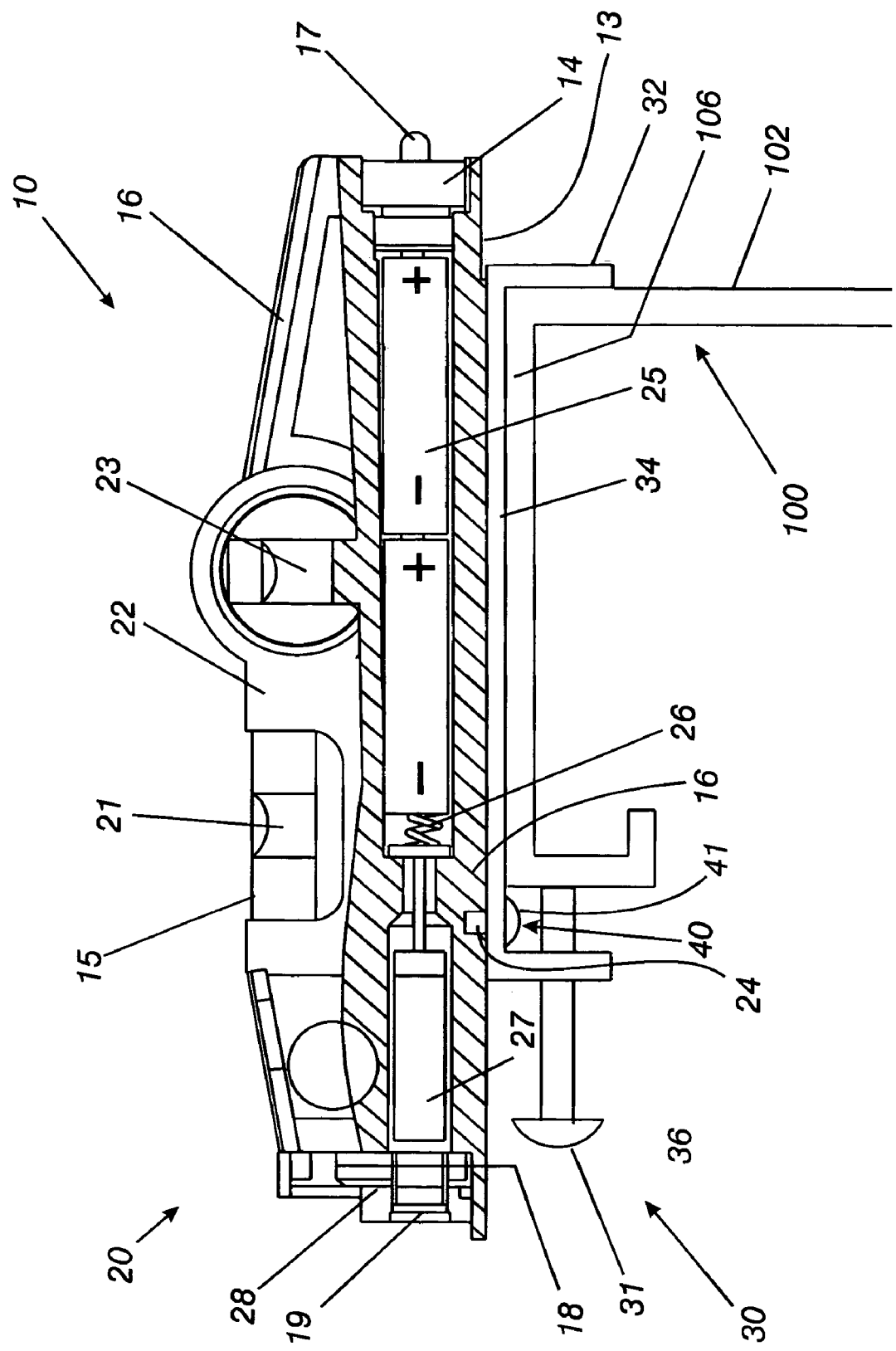
FIG. 2 is a cross-sectional side view of the trailer hitch alignment device taken along longitudinal sectional line 2-2.

The invention is a trailer hitch alignment device 10 that synergistically combines a laser level 20 with an alignment mounting bracket 30, where the bracket, using a fastening means 40, provides a base on a vehicle 100 for affixing the laser level 20 to the vehicle 100. While a variety of laser levels are suitable, in a preferred embodiment the laser level has a frame that has good weathering characteristics and provides a protective housing for the laser. An example of a laser level having the desired properties is manufactured by Shinty Optic-Electric Instruments Co, Ltd. of China, Model Number TD20, wherein the level has an aluminum frame 22. An illustrated embodiment of the trailer hitch alignment device 10 is shown in FIG. 1. In the figure, the laser level 20 is shown affixed to the alignment mounting bracket 30. The fastening means 40, as shown in FIG. 2 and FIG. 3, is not visible in this view. The vehicle 100 is shown in ghost, and is not part of the disclosed trailer hitch alignment device 10, however, as shown in FIG. 4 the vehicle 100 is part of the trailer hitch alignment system 1. The laser level generates a laser beam, which can, in the illustrated embodiment, either be a spot or a line that is horizontal with a level first side 13, where the level first side 13 is substantially the foot or skeg of the level. The first side 13 is fitted flush with the upper surface 33 of the alignment mounting bracket 30. As shown in the illustrated embodiment the alignment mounting bracket 30 is a sectional length of extruded channel metal having a flat bottom 34 and two sides, a front flange 32, and a rear flange 36, where the extruded channel metal is sufficiently wide to span an upper ledge of a front wall of a truck bed. The preferable extruded channel metal is a sectional length of extruded channel aluminum. The bracket 30 has two threaded holes, each fitted a clamping bolt 31. The clamping bolt shown has a hexagonal head, and is suitable for fastening with tools, but a hand clamp bolt would be equally as effective.

FIG. 2 is a cross-sectional side view of the trailer hitch alignment device 10 taken along longitudinal sectional line 2-2 of FIG. 1. As illustrated in the drawing, the laser 27 can be turned on and off by depressing button 17 on switch 14. The laser is powered by a pair of spring 26 loaded batteries 25 housed in the level. The batteries are in electrical contact with the laser 27 and the switch 14. As shown in FIG. 2, the laser beam is refracted by fan lens 19, thereby forming a projected image that is a line. In addition to having an aluminum housing 22 the horizontal bubble tube 21 has a protective clear plastic covering 15. The front of the laser 18 is a plastic cap 28 with grooves for sliding the fan lens 19. The level first side 13 is mounted substantially flush with the top of the bracket 30, and via the fastening means 40. The upper side of the level 20 has a handle 16 for facilely holding the device and directing the laser beam 29, as shown in FIG. 1. The fastening means 40 is a male connector selected from the group consisting of screws, push locks, twist locks, snap locks, rivets and a female connector for receiving the male connector. In the illustrated embodiment the male connector is a threaded bolt 40 that is screwed into the female connector 24. The female connector 24 is recessed in the level first side 13.

In use, the bracket 30 is mounted substantially flush with the top ledge 106 of the front wall 102 of the truck bed of the vehicle 100. The clamping bolts, each identified as 31 in FIG. 3, are adjusted so as to clamp the bracket 30 securely to the front wall 102 of the vehicle/truck 100, wherein the laser beam is directed toward the rear of the truck 100.

In FIG. 3, which is a bottom plan view of the trailer hitch alignment device 10, the relative dimensions of the laser level 20 and the alignment mounting bracket 30 are shown. The alignment mounting bracket 30 is substantially a mounting clamp, comprised of the sectional length of extruded channel metal having a length 62 that is wider than the width 2 of the level first side 13. The extruded channel metal is long enough to provide dimensional stability to the laser level 20, and long enough to make it relatively easy to access the clamping bolts 31. The bottom 34 of the bracket 30 has a relatively flat lower surface 37 with a width 64 that is a base for much of the length 4 of the laser level 20. The width 64 of the bracket 30 is wider than the top ledge 106 of the front wall 102 of the truck bed. The clamping bolts 31 threadily penetrate the rear channel flange 36, thereby forming a variably constricted effective channel width, wherein inward adjustment constricts the effective width of the channel and outward adjustment widens the effective width of the channel. Nuts 33 can be tightened to lock the clamping bolts 31, thereby preventing the bolts from working loose.

FIG. 4 is a diagrammatic perspective view of the trailer hitch alignment system 1. The system 1 is comprised of a trailer hitch alignment device 10, a truck 100 having a fifth wheel hitch 80 with a top plate 84 and a front wall 102 of a truck bed 110, where the fifth wheel hitch 80 is mounted on the truck bed 110 of the truck 100; a trailer 200 having a tongue 206, where the tongue 206 of the trailer has a tow pin 208 and a visible reference surface 204 with a target alignment zone. The trailer hitch alignment device 10 is mounted on the top ledge 106 of the front wall 102 of the truck bed 110 at a point substantially equidistant from a left and a right side of the truck 100, with the laser aimed toward the rear of the truck so that the laser beam bisects the top plate 84 of the fifth wheel hitch 80 and projects a lighted image 202 on the visible reference surface 204 of the trailer 20 when the truck is properly aligned with the trailer. The truck position is steered so as to maintain the lighted image 202 within an acceptable zone of alignment as the truck is backed up. The alignment is completed when the tow pin 208 engages the socket 82 of the fifth wheel hitch 80.

The trailer hitch alignment system can further be utilized to determine whether the truck bed is properly balanced before and after the trailer is hitched by inspecting the horizontal bubble tube 21. The trailer hitch alignment device can synergistically be employed, by detecting the position of the lighted image 202 on the visible reference surface 204 of the trailer 200, whether the tongue 206 is adjusted to the correct height for hitching. The fifth wheel hitch typically has a pneumatic shock absorber, and the absorber should compress after the trailer is hitched. The position of the lighted image 202 on the reference surface 204 will indicates whether the tow pin 208 is properly seated in the hitch 80.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function, it is intended that such claim be construed to cover the corresponding structure, material, or acts described in the specification and equivalents thereof, including both structural equivalents and equivalent structures.

What is claimed is:

1. A trailer hitch alignment system, said system comprising:
    a) a trailer hitch alignment device, said device comprising:
        a level comprised of a level first side with a length and width, and a horizontal bubble tube, said horizontal bubble tube indicating when the level first side has an orientation that is substantially perpendicular to plumb;
        a laser housed by the level, said laser mounted such that an emitted laser beam is coaxial to the laser and parallel to the level first side and the laser beam projects beyond the length of the level first side;
        a single alignment mounting bracket having a base with a channel to which is directly mounted the level orthogonal to the channel, where said bracket fastens to a top ledge of a front wall of a truck bed, where said laser beam provides a guide for coupling a trailer to the vehicle;
        a fastening means that attaches the laser to the alignment mounting bracket;
    b) a truck having a fifth wheel hitch with a top plate, where the fifth wheel hitch is mounted on the truck bed of the truck;
    c) a trailer having a tongue, where the tongue of the trailer has a tow pin and a visible reference surface with a target alignment zone;
    where said device is mounted at a point substantially equidistant from a left and a right side of the truck, with the laser aimed toward the rear of the truck so that the laser beam is substantially parallel to the truck bed regardless of the orientation of the truck, bisects the top plate of the fifth wheel hitch, and projects a lighted image on the visible reference surface of the trailer when the truck is properly aligned with the trailer;
    where the mounting bracket receives the top ledge of the front truck wall, therein orienting said laser beam rearward;
    wherein the truck position can be steered so as to maintain the lighted image within an acceptable zone of alignment as the truck is backed up; and
    wherein alignment is completed when the tow pin engages the fifth wheel hitch.

2. The trailer hitch alignment system, as claimed in claim 1, wherein said horizontal bubble tube indicates whether the truck bed is properly balanced before and after the trailer is hitched.

3. The trailer hitch alignment system, as claimed in claim 1, wherein said lighted image on the visible reference surface of the trailer indicates whether the tongue is adjusted to the correct height for hitching.

4. The trailer hitch alignment system, as claimed in claim 1, wherein said lighted image on the visible reference surface of the trailer indicates whether the tow pin is properly seated in the hitch.

5. A trailer hitch alignment system, said system comprising:
    a) a trailer hitch alignment device, said device comprising:
        a laser level comprised of:
            a level having a level first side with a length and width, and a horizontal bubble tube, said horizontal bubble tube indicating when the level first side has an orientation that is substantially perpendicular to plumb;
            a laser mounted such that an emitted laser beam is coaxial to the laser and parallel to the level first side and the laser beam projects beyond the length of the level first side;
        a single alignment mounting bracket that fastens to a top ledge of a front wall of a truck bed, said bracket having a base with a channel to which is directly mounted the laser level orthogonal to the channel, said laser beam emitting from an end of the laser aligned with the length of the level first side, therein providing a guide for coupling a trailer to the vehicle;
        a fastening means that attaches the laser level to the alignment mounting bracket;
    b) a truck having a fifth wheel hitch with a top plate, where the fifth wheel hitch is mounted on the truck bed of the truck;
    c) a trailer having a tongue, where the tongue of the trailer has a tow pin and a visible reference surface marked with a target alignment zone;
    where said device is mounted at a point substantially equidistant from a left and a right side of the truck, with the laser aimed toward the rear of the truck so that the laser beam is substantially parallel to the truck bed regardless of the orientation of the truck, bisects the top plate of the fifth wheel hitch, and projects a lighted image on the visible reference surface of the trailer when the truck is properly aligned with the trailer;
    wherein the truck position can be steered so as to maintain the lighted image within an acceptable target alignment zone as the truck is backed up, and
    wherein alignment is completed when the pull pin engages the fifth wheel hitch.

* * * * *